United States Patent
Goodart et al.

(10) Patent No.: US 8,972,766 B2
(45) Date of Patent: *Mar. 3, 2015

(54) POWER MANAGEMENT METHODS AND SYSTEMS USING AN EXTERNAL POWER SUPPLY

(71) Applicants: Joe E. Goodart, Austin, TX (US); Gary J. Verdun, Georgetown, TX (US); Shree Dandekar, Round Rock, TX (US)

(72) Inventors: Joe E. Goodart, Austin, TX (US); Gary J. Verdun, Georgetown, TX (US); Shree Dandekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/048,434

(22) Filed: Oct. 8, 2013

(65) Prior Publication Data

US 2014/0040608 A1    Feb. 6, 2014

Related U.S. Application Data

(63) Continuation of application No. 12/409,001, filed on Mar. 23, 2009, now Pat. No. 8,589,713.

(51) Int. Cl.
*G06F 1/26* (2006.01)
*G06F 1/32* (2006.01)
*G06F 9/44* (2006.01)

(52) U.S. Cl.
CPC ............. *G06F 1/266* (2013.01); *G06F 1/263* (2013.01); *G06F 1/3203* (2013.01); *G06F 9/4406* (2013.01)
USPC .......................................... 713/340; 713/300

(58) Field of Classification Search
None
See application file for complete search history.

(56) References Cited

U.S. PATENT DOCUMENTS

| | | | |
|---|---|---|---|
| 5,982,146 A | 11/1999 | Nguyen | |
| 7,042,436 B2 | 5/2006 | Rossi | |
| 8,589,713 B2 * | 11/2013 | Goodart et al. | 713/340 |
| 2002/0023235 A1 | 2/2002 | Odaohhara | |
| 2005/0099159 A1 | 5/2005 | Ishida | |
| 2007/0145962 A1 | 6/2007 | Huang et al. | |
| 2008/0200220 A1 | 8/2008 | Jackson | |

* cited by examiner

*Primary Examiner* — Paul Yanchus, III
(74) *Attorney, Agent, or Firm* — Baker Botts L.L.P.

(57) ABSTRACT

A method for managing power to an information handling system (IHS) is disclosed wherein the method includes providing a battery and an external power supply operable to supply power to the IHS. The method also includes providing an application programming interface (API) to the IHS, wherein the API is configured to monitor a first parameter and a second parameter. The method further includes supplying power to the IHS via the external power supply if the first parameter reaches a first threshold level and supplying power to the IHS via the battery if the second parameter reaches a second threshold level. An information handling system (IHS) is further disclosed including an external power supply, a battery, and a controller operable to select between the external power supply and the battery to supply power to the IHS. The IHS further includes an application programmable interface (API) operable to monitor a first parameter and direct the controller to select the external power supply to supply power to the IHS if the first parameter reaches a first threshold level, and wherein the API is further operable to monitor a second parameter and direct the controller to select the battery to supply power to the IHS if the second parameter reaches a second threshold level.

20 Claims, 3 Drawing Sheets

POWER MANAGEMENT METHODS AND SYSTEMS USING AN EXTERNAL POWER SUPPLY

CROSS-REFERENCE TO RELATED APPLICATIONS

This application is a continuation of pending U.S. patent application Ser. No. 12/409,001 filed Mar. 23, 2009; the contents of which is incorporated herewith in its entirety.

BACKGROUND

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

For today's notebook computers and other portable electronic devices, their associated external power supplies must also be portable and be capable of operating under different load conditions. For example, different load conditions for an external power supply may exist depending on if a notebook computer is in standby mode, operating system (OS) idle or running a high performance application. Furthermore, different load conditions can exist depending on the charge level of the battery.

However, modern external power supplies are usually only optimized for power efficiency over a small range of load conditions. In other words, for certain load conditions, the external power supply may be relatively efficient while for other load conditions, it may be relatively inefficient. Furthermore, normal operation of an associated electronic device may not occur in the optimized range for the external power supply. For example, an AC adaptor for a notebook computer may be most efficient when operating at a 90% load rating, i.e., 90% of the maximum rated power output of the adapter. However, the notebook may rarely need such a high amount of power, and the AC adaptor may in fact frequently operate at a 10% to 20% load rating where it is much less efficient.

Current methods concerning external power supplies may focus on reducing power consumption when the external power supply is in an unused state. For example, if a notebook computer is switched off, an AC adaptor may be operable to reduce its power consumption since the notebook computer may need relatively little to no power. These methods, however, may not address increasing the efficiency of the external power supply while it is in operation.

Thus, a need exists for methods and systems for increasing the efficiency of an external power supply.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure provides for a method for managing power to an information handling system (IHS) wherein the method includes providing a battery and an external power supply operable to supply power to the IHS. The method also includes providing an application programming interface (API) to the IHS, wherein the API is configured to monitor a first parameter and a second parameter. The method further includes supplying power to the IHS via the external power supply if the first parameter reaches a first threshold level and supplying power to the IHS via the battery if the second parameter reaches a second threshold level.

Another aspect of the disclosure provides for an information handling system (IHS) including an external power supply, a battery, and a controller operable to select between the external power supply and the battery to supply power to the IHS. The IHS further includes an application programmable interface (API) operable to monitor a first parameter and direct the controller to select the external power supply to supply power to the IHS if the first parameter reaches a first threshold level, and wherein the API is further operable to monitor a second parameter and direct the controller to select the battery to supply power to the IHS if the second parameter reaches a second threshold level.

Wet another aspect of the disclosure provides a method for providing power to an information handling system (IHS). The method includes providing a battery and an external power supply operable to supply power to the IHS and providing an application programming interface (API) to the IHS, wherein the API is configured to monitor a charge capacity of the battery, an IHS power level, and a current output by the external power supply. The method further includes supplying power to the IHS via the external power supply if the charge capacity of the battery reaches a first threshold level and the IHS power level reaches second threshold level. Furthermore, the method includes supplying power to the IHS via the battery if the current output by the external power supply reaches a third threshold level.

A further aspect of the disclosure provides a computer-readable medium having computer-executable instructions for performing a method for managing power to an information handling system (IHS) wherein the method includes providing a battery and an external power supply operable to supply power to the IHS. The method also includes providing an application programming interface (API) to the IHS, wherein the API is configured to monitor a first parameter and a second parameter. The method further includes supplying power to the IHS via the external power supply if the first parameter reaches a first threshold level and supplying power to the IHS via the battery if the second parameter reaches a second threshold level.

BRIEF DESCRIPTION OF THE DRAWINGS

For detailed understanding of the present disclosure, references should be made to the following detailed description of the several aspects, taken in conjunction with the accompanying drawings, in which like elements have been given like numerals and wherein.

DETAILED DESCRIPTION

Before the present systems, methods, and computer-readable mediums are described, it is to be understood that this disclosure is not limited to the particular apparatus, systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a circuit" refers to one or several circuits and reference to "a method of managing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
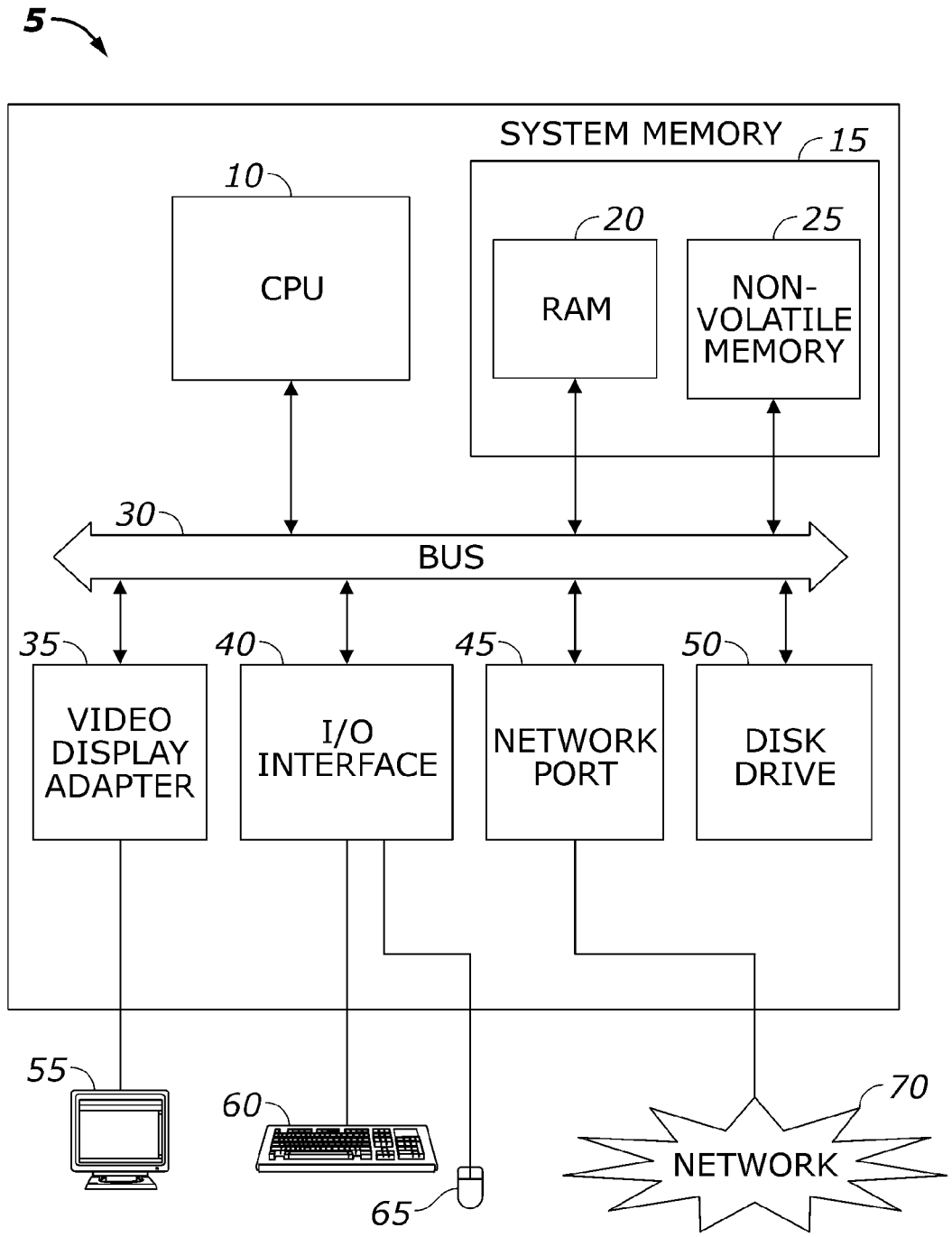
FIG. 1 represents an information handling system (IHS) in accordance with one aspect of the present disclosure.

FIG. 1 illustrates one possible implementation of an IHS 5 comprising CPU 10. It should be understood that the present disclosure has applicability to IHSs as broadly described above, and is not intended to be limited to the IHS 5 as specifically described. The CPU 10 may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The system memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The system memory 15 may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
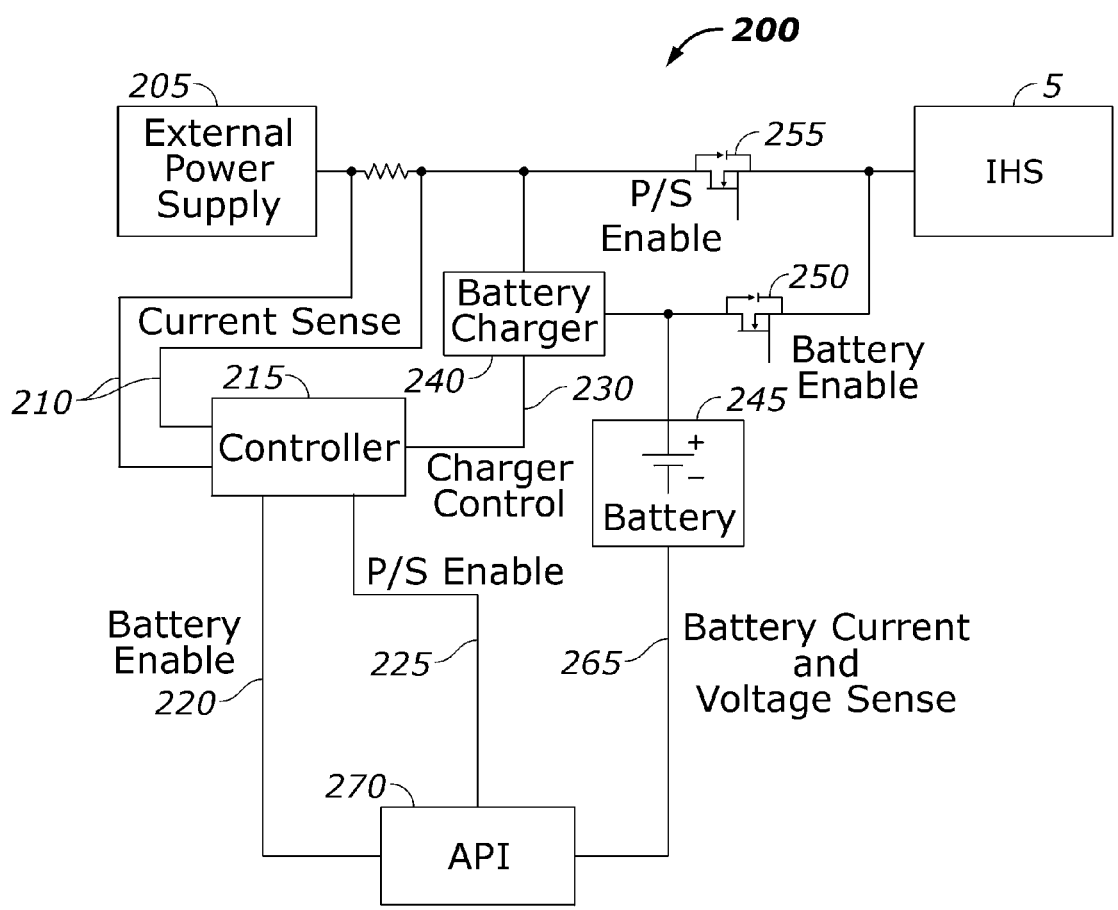
FIG. 2 represents a schematic of an IHS configured to enable an external power supply in accordance with one aspect of the present disclosure.

FIG. 2 represents a schematic illustrating a framework 200 for enabling an external power supply in accordance with one aspect of the present invention. As used herein, the efficiency of the external power supply 205 may refer to the percentage of power actually transferred from the framework 200 to the IHS 5 and not lost through heat or other energy losses. Generally, the framework 200 may enable the external power supply 205 to supply power to the IHS 5 during its most efficient load conditions. A load may generally refer to any electronic device or circuit coupled to an output of another circuit. Thus, as used herein, a load may refer to a device coupled to the output of the external power supply 205, e.g. IHS 5. Furthermore, a load condition may refer to the amount of current drawn by the load on the external power supply 205. When load conditions reach levels such that the external power supply experiences a loss in efficiency, the framework 200 may then uncouple the external power supply 205 from the IHS 5 and couple the battery 245 to the IHS 5. The battery 245 may then supply power to the IHS 5 until load conditions once again reach levels where the external power supply 205 can operate at a relatively high efficiency. At this point, the framework 200 may uncouple the battery 245 from the IHS 5 and again couple the external power supply 205 to the IHS 5 to supply power to the IHS 5

FIG. 2 depicts an external power supply 205 in communication with a controller 215, battery charger 240, battery 245, and IHS 5. The framework 200 may further include an application programmable interface (API) 270 in communication with the controller 215 and the battery 245. An API may be a set of instructions, methods, procedures, protocols, and/or the like provided by an operating system (OS) or any other type of software to support requests made by a computer program to the OS. Thus, APIs may provide a standardized way for computer programs to communicate with an OS or with each other. In one implementation, the API 270 may be part of the Quickset interface. Quickset may be one example of an application that enables a user to access power management diagnostics and settings. Furthermore, the API 270 may be operable to communicate with the IHS Basic Input/Output System (BIOS) to regulate power management.

The external power supply 205, by way of example, may be an Alternating Current (AC) adaptor. An AC adaptor may be a device for converting an AC voltage into a direct current (DC) voltage. The method by which an AC adaptor converts AC to DC voltage is well known in the art. Moreover, the external power supply 205 may also be capable of detecting when no load is coupled to it. Under these conditions, the external power supply 205 may toggled off or engage in "sleep mode" so as to draw relatively little power, if any, from the AC power source.

The controller 215, as applied to FIG. 2, may be or may comprise an electronic device such as a circuit. Generally, the controller 215 may be operable to measure the power output by the external power supply via the current sense line 210. In addition, the controller 215 may manage the charging of the battery 245 via the charger control 230. Thus, the controller 215 may be operable to select a power source, between the external power supply 205 and the battery 245, to supply power to the IHS 5. Furthermore, in some implementations, the controller 215 may be embedded on the IHS 5.

In instances where the battery 245 is to supply power to the IHS 5, the API 270, may provide a battery enable 220 signal to the controller 215. In addition, while the battery 245 supplies power to the IHS 5, the API 270 may monitor the charge capacity of the battery 245 and an IHS power level via the battery current and voltage sense 265 signal path. An IHS power level may refer to the amount of power that the IHS 5 is drawing from the battery 245 which may be calculated by a combination of the battery voltage and current. Furthermore, if the battery enable 220 signal is provided to the controller, the p/s enable switch 255 may be opened and the battery enable switch 250 may be closed to the voltage regulator 260. Thus, in effect, when the battery 245 is supplying power to the IHS 5, the external power supply 205 maybe uncoupled from the IHS 5 and not drawing any power.

On the other hand, during times where the external power supply 205 is to supply power to the IHS, the API 270 may provide a power supply (p/s) enable 225 signal to the controller 215. During these instances, the API 270 may monitor a current output by the external power supply 205 via the current sense 210. Furthermore, if the p/s enable 225 signal is provided to the controller, the controller 215 may initiate the battery charger 240 via the charger control 230 to charge the battery 245. The controller 215 may then cause the p/s enable switch 255 to be closed to the IHS 5 and cause the battery enable switch 250 to open. Thus, when the external power supply 205 is supplying power to the IHS 5, the battery 245 may be uncoupled from the IHS 5 and may be charging.

In one implementation, the framework 200 may be designed to incorporate an external power supply 205 with relatively high load efficiency. In other words, the external power supply 205 may operate at a relatively high efficiency under a relatively high load condition and operate at a relatively low efficiency for a relatively low load condition. Therefore, in such an implementation, it may be desirable to enable the external power supply 205 to supply power to the IHS 5 under relatively high load conditions so that the external power supply 205 is operational during moments where it has a relatively high efficiency.

For example, if the battery 245 is providing power to the IHS 5, the API 270 may monitor the voltage or charge capacity of the battery 245 via the battery current and voltage sense 265 or any other capacity measurement device until the battery 245 reaches a threshold level such as 40% of its charge capacity. In one implementation, the framework 200 may include a Battery Management Unit (not pictured) operable to measure voltages on individual cells in the battery 245 as well as current flowing in and out of the cells. As such, when the charge on the battery 245 is at 40% of its capacity or perhaps lower, supplying current to charge the battery 245 by itself may be considered a high load condition for the external power supply 205 by the API. Indeed, at this charge capacity, the charge rate (i.e., current supplied to the battery 245 by the external power supply 205) may be relatively high.

In another implementation, even if the battery has not reached a threshold level such as 40% of its charge capacity, the API may still determine that a high load condition exists if the IHS power level reaches its own separate threshold. In either implementation, an external power supply with a relatively high load efficiency may operate at a relatively high efficiency at these threshold levels. Therefore, the API 270 may provide a p/s enable 225 signal to the controller 215 to initiate the external power supply 205 while simultaneously uncoupling the battery from the IHS and turning on the battery charger 240.

The API 270 may then continue monitoring the charge on the battery 245 until the charge reaches another threshold level such as 90% of the battery's 245 capacity. In this situation, the load condition for the external power supply may be considered relatively low because the battery charge rate may need to be reduced. Thus, the API 270 may then provide a battery enable signal 220 to the controller 215 to uncouple the external power supply 205 and revert back to the battery to supply power to the IHS 5.

It should be noted that while FIG. 2 is described with references to particular percentages in charge capacity, the present disclosure is not limited to these specific percentages and may encompass a wide range of percentages. Furthermore, in other implementations, while the external power supply 270 is supplying power to the IHS 5 and charging the battery 245, the API 270 may monitor the current output by the external power supply 205 rather than the charge on the battery 245 as a means to determine which power source to use. The API 270 may perform this function via the current sense 210 to the controller 215. Additionally, all components illustrated in FIG. 2 may also be embedded on the IHS 5, excluding the external power supply 205 and the IHS 5 itself.

Figure 3:
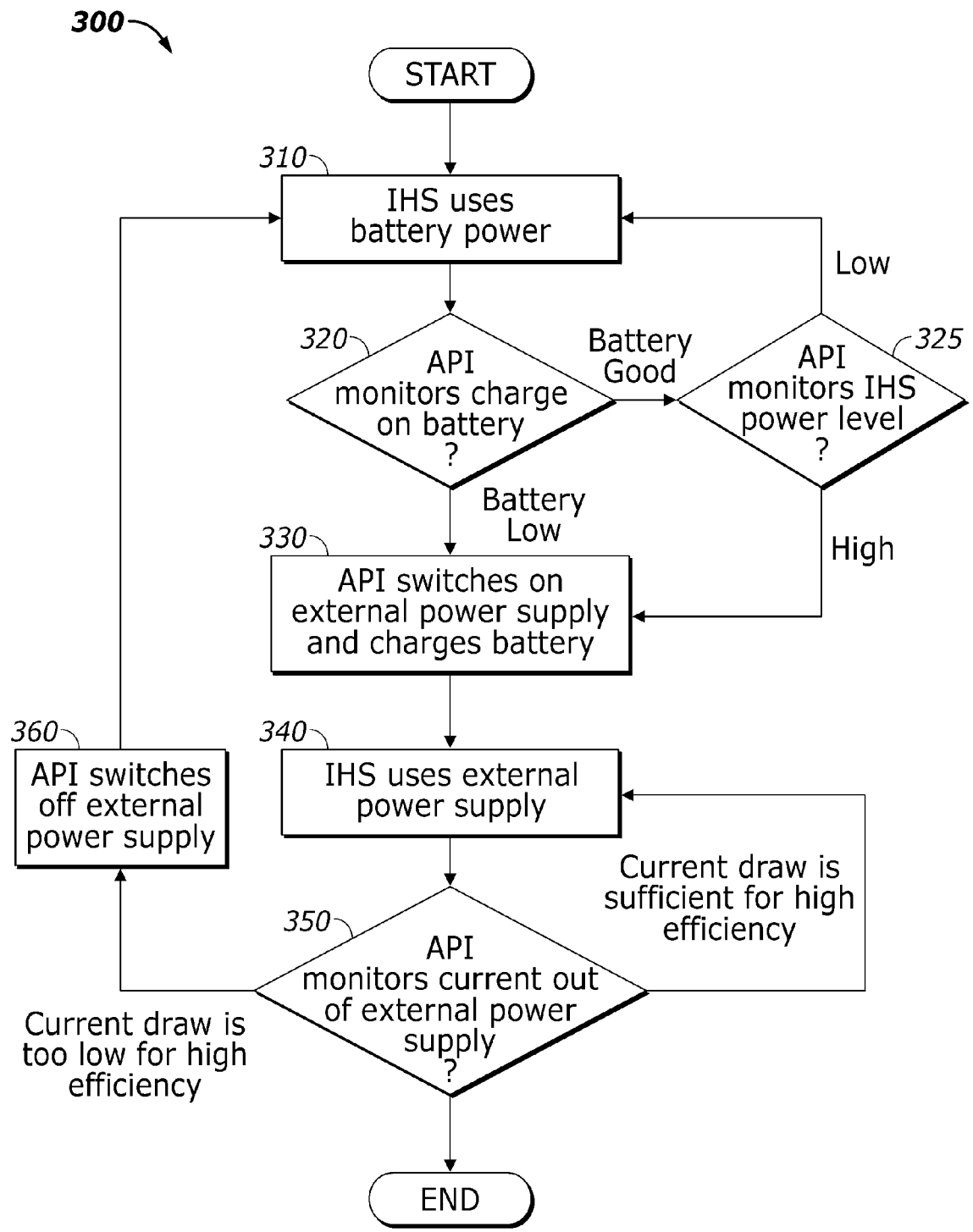
FIG. 3 represents a flow diagram of a method for operating an external power supply in accordance with one aspect of the present disclosure.

Turning now to FIG. 3, a flow diagram is represented that provides a method 300 for operating an external power supply coupled to an IHS in accordance with one aspect of the present invention. The method 300 begins in step 310 where the IHS uses battery power. During this time, the API may monitor a first parameter, which may include the charge on the battery, in step 320. If the battery is good, i.e., the battery has not reached a first threshold level such as 40% of its charge capacity as described in FIG. 2, the API may continue to step 325. In step 325, the API may monitor the IHS power level. If the IHS power level is low, i.e., it remains below a separate threshold level, the IHS may continue using battery power in step 310. However, if the charge on the battery reaches the first threshold level (e.g. 40%), or the IHS power level reaches its separate threshold level, the API may toggle on the external power supply and charge the battery in step 330.

As previously mentioned, when the battery reaches the first threshold level, the external power supply may operate at a relatively high efficiency while charging the battery. Similarly, when the IHS power level reaches its threshold level, load conditions may be high enough that the external power supply can provide power to the IHS also at a relatively high efficiency. In one implementation, step 330 may be performed by coupling the external power supply to the IHS and uncoupling the battery as described in FIG. 2. In another implementation, the API may instead communicate with an optional control circuit within the external power supply in order to manually toggle the external power supply to an on-state, i.e. powering on the external power supply, from an off-state, i.e. a state in which the external power supply is powered off.

In step 340, after the API has toggled on the external power supply, the IHS may continue to use the external power supply to draw power. Next in step 350, the API may then monitor a second parameter, which may include the current output by the external power supply. If the current has not reached a second threshold level and is still sufficient for the external power supply to operate with a high efficiency, the IHS may continue to use the external power supply. However, if the current in fact reaches the second threshold level, the API may toggle off the power supply in step 360, and the IHS may revert back to using battery power in step 310. As such, the current reaching the second threshold level may indicate a relatively low current draw by the IHS. To this end, relatively low current draw may be associated with activities including, but not limited to, the IHS operating in a "sleep mode" or "hibernate state," and/or the IHS operating in an idle state with little application activity (e.g., reading emails, document editing, and the like).

As previously mentioned, in one implementation, the external power supply may be uncoupled from the IHS and the battery coupled as described with reference to FIG. 2. In another implementation, the API may toggle off the external power supply via an optional control circuit located within the external power supply. In yet another implementation, rather than monitoring the current output by the external power supply in step 350, the API may in fact monitor the charge on the battery as described in the framework of FIG. 2. Accordingly, the second threshold level would be the voltage on the battery in this situation. Thus, the method 300 may indicate a constant loop by which the API monitors the charge on the battery and the current output by the external power supply to determine which power source supplies power to the IHS.

As mentioned above, the external power supply may be efficient under relatively high load conditions. By toggling on the external power supply only when the charge on the battery has reached the first predetermined level, the method 300 may enable to external power supply to operate with relatively high efficiency. Furthermore, because the external power supply may be relatively inefficient under low load conditions, the method 300 may toggle off the external power supply during these moments. Thus, the overall efficiency of the external power supply when in operation may be increased.

It should be noted that various methods are contemplated by the present disclosure including any of the steps described herein or mentioned above, any number of repeats of any of the steps herein, and performance of the steps in any order. In addition, in reference to FIG. 3, both the first threshold level and the second threshold level may be a value, ratio, percentage, and/or the like as determined or set by any entity, device, application, etc.

Furthermore, methods of the present disclosure, detailed description and claims may be presented in terms of logic, software or software implemented aspects typically encoded on a variety of media or medium including, but not limited to, computer-readable medium/media, machine-readable medium/media, program storage medium/media or computer program product. Such media, having computer-executable instructions, may be handled, read, sensed and/or interpreted by an IHS. Generally, computer-executable instructions, such as program modules, may include routines, programs, objects, components, data structures, and the like, which perform particular tasks, carry out particular methods or implement particular abstract data types. Those skilled in the art will appreciate that such media may take various forms such as cards, tapes, magnetic disks (e.g., floppy disk or hard drive) and optical disks (e.g., compact disk read only memory ("CD-ROM") or digital versatile disc ("DVD")). It should be understood that the given implementations are illustrative only and shall not limit the present disclosure.

Although the present disclosure has been described with reference to particular examples, embodiments and/or implementations, those skilled in the art will recognize that modifications and variations may be made without departing from the spirit and scope of the claimed subject matter. Such changes in form and detail, including use of equivalent functional and/or structural substitutes for elements described herein, fall within the scope of the appended claims and are intended to be covered by this disclosure.

What is claimed is:

1. An article of manufacture comprising a non-transitory computer-readable medium storing
    control coupling and uncoupling of an external power supply to instructions, that, when executed by a processor, cause the processor to: an information handling system (IHS), including instructions to monitor parameters, the parameters selected from at least one of:
    an IHS power level;
    a first parameter indicating a battery charge level; and
    a second parameter indicating a current draw of the external power supply,
    wherein the instructions to control coupling and uncoupling include instructions to:
        when the first parameter is associated with a first threshold level, enable the external power supply to power the IHS and charge a battery, wherein the external power supply is operated within a given efficiency range; and
        when the second parameter is associated with a second threshold level, enable the battery to supply power to the IHS,
    wherein the battery is associated with the battery charge level and is operable to supply power to the IHS, and wherein the external power supply is operable to supply power to the IHS and to the battery.

2. The article of manufacture of claim 1, wherein the instructions to enable the external power supply to power the IHS and charge the battery include instructions to:
    cause an output of the external power supply to be coupled to the IHS;
    cause an output of the battery to be uncoupled from the IHS; and
    cause the external power supply to be switched to an on-state.

3. The method of claim 1, wherein the instructions to enable the battery to supply power to the IHS include instructions to:
    cause the external power supply to be switched to an off-state; and
    cause an output of the battery to be coupled to the IHS.

4. The method of claim 1, wherein the instructions to enable the battery to supply power to the IHS include instructions to:
    cause an output of the external power supply to be uncoupled from the IHS and coupled to the battery.

5. The method of claim 1, wherein the second parameter is the current draw from the external power supply and the second threshold level is a current limit for the current draw.

6. The method of claim 1, wherein the first parameter is a charge level of the battery and the first threshold level is 40% of a charge capacity of the battery.

7. The method of claim 1, wherein the first parameter is a voltage of the battery and the first threshold level is 90% of a charge capacity of the battery.

8. The method of claim 1, wherein the first parameter and the second parameter are a charge level of the battery.

9. The method of claim 1, wherein the instructions to control coupling and uncoupling of the external power supply include instructions to:
   direct a controller enabled to switch the external power supply to the IHS.

10. An information handling system (IHS) comprising:
   a processor configured to access memory media;
   a battery; and
   a controller controllable by the processor, the controller for selecting between an external power source and the battery to supply power to the IHS,
   wherein the memory media include instructions executable by the processor to:
   monitor parameters including at least one of:
     an IHS power level;
     a first parameter indicating a battery charge level; and
     a second parameter indicating a current draw of the external power source;
   when the first parameter is associated with a first threshold level, direct the controller to:
     select the external power supply to supply power to the IHS; and
     charge the battery;
   when the second parameter is associated with a second threshold level, direct the controller to deselect the external power source and select the battery to supply power to the IHS, wherein the external power source is operated within a given efficiency range.

11. The system of claim 10, wherein the external power source is an external power supply associated with the IHS, and wherein the IHS is a portable IHS.

12. The system of claim 10, wherein the controller selecting the external power source includes switching the external power source to an on-state using a control circuit.

13. The system of claim 12, wherein the controller selecting the battery includes the controller switching the external power source to an off-state using the control circuit.

14. The system of claim 12, wherein the controller selecting the battery includes the controller:
   coupling the battery to the IHS; and
   uncoupling the external power source from the IHS.

15. The system of claim 10, wherein the controller selecting the external power source includes the controller:
   coupling an output of the external power source to the IHS; and
   uncoupling the battery from the IHS.

16. The system of claim 10, wherein the first threshold level is a maximum of 40% of a charge capacity of the battery, and the second threshold level is a minimum of 90% of the charge capacity of the battery.

17. A power management system for managing power delivered to an information handling system (IHS), the power management system comprising:
   a processor configured to access memory media; and
   a controller controllable by the processor, the controller for selecting between an external power supply and a battery to supply power to the IHS,
   wherein the memory media include instructions executable by the processor to:
   monitor parameters including at least one of:
     an IHS power level;
     a first parameter indicating a battery charge level; and
     a second parameter indicating a current draw of the external power source;
   when the first parameter is associated with a first threshold level, direct the controller to:
     select the external power supply to supply power to the IHS; and
     charge the battery;
   when the second parameter is associated with a second threshold level, direct the controller to deselect the external power supply and select the battery to supply power to the IHS, wherein the external power source is operated within a given efficiency range.

18. The power management system of claim 17, wherein the processor executes a basic input/output system (BIOS) of the IHS.

19. The power management system of claim 17, wherein the controller is enabled to:
   cause an output of the external power supply to be switched to the IHS; and
   cause the battery to be switched to the IHS.

20. The power management system of claim 17, wherein the first threshold level is a maximum value for a charge level of the battery, and the second threshold level is a minimum value for the charge level of the battery.

* * * * *